United States Patent [19]
Huss

[11] Patent Number: 5,237,227
[45] Date of Patent: Aug. 17, 1993

[54] EXCITER ROTOR FLOW THROUGH COOLING

[76] Inventor: John B. Huss, 1141 Sand Pebble Dr., Rockton, Ill. 61072

[21] Appl. No.: 874,677

[22] Filed: Apr. 27, 1992

[51] Int. Cl.$^5$ .................... H02K 9/00; H02K 11/00
[52] U.S. Cl. .................... 310/54; 310/68 D
[58] Field of Search .................... 310/54, 59, 61, 62, 310/68 D, 68 R, 89, 112, 262, 43, 44, 165

[56] References Cited

U.S. PATENT DOCUMENTS

| | | |
|---|---|---|
| 1,507,606 | 9/1920 | Von Kando . |
| 1,914,988 | 7/1929 | Bergstrom . |
| 2,894,155 | 3/1955 | LaBastie .................... 310/54 |
| 2,897,383 | 3/1957 | Barrows et al. .................... 310/68 |
| 2,970,234 | 1/1961 | Erickson .................... 310/63 |
| 3,034,003 | 5/1962 | Seidner .................... 310/61 |
| 3,209,184 | 9/1965 | Woodward, Jr. .................... 310/103 |
| 3,439,201 | 4/1969 | Levy et al. .................... 310/52 |
| 3,461,331 | 8/1969 | Pannell .................... 310/270 |
| 3,469,127 | 12/1967 | Eggemann et al. .................... 310/54 |
| 3,475,631 | 10/1969 | Stark et al. .................... 310/58 |
| 3,643,119 | 2/1972 | Lukens .................... 310/60 |
| 3,716,732 | 2/1973 | Tillma .................... 310/61 |
| 3,894,253 | 7/1975 | Willyoung .................... 310/61 |
| 4,066,921 | 1/1978 | Blank .................... 310/61 |
| 4,155,019 | 5/1979 | Weghaupt .................... 310/61 |
| 4,409,502 | 10/1983 | McCabria .................... 310/61 |
| 4,484,049 | 11/1984 | Ahner et al. .................... 219/10.51 |
| 4,496,862 | 1/1985 | Weber .................... 310/56 |
| 4,647,805 | 3/1987 | Flygare et al. .................... 310/61 |
| 4,728,840 | 3/1988 | Newhouse .................... 310/113 |
| 4,740,724 | 4/1988 | Sato et al. .................... 310/52 |
| 4,745,315 | 5/1988 | Terry, Jr. et al. .................... 310/68 |
| 4,890,988 | 1/1990 | Kramer et al. .................... 417/372 |
| 4,900,959 | 2/1990 | Drinkut et al. .................... 310/68 D |
| 4,922,146 | 5/1990 | Vanduyn .................... 310/59 |

FOREIGN PATENT DOCUMENTS

| | | |
|---|---|---|
| 220809 | 7/1957 | Australia . |
| 620918 | 5/1961 | Canada . |
| 1087258 | 8/1960 | Fed. Rep. of Germany . |
| 2103432 | 8/1971 | Fed. Rep. of Germany . |
| 1390679 | 1/1965 | France . |
| 1555050 | 1/1969 | France . |
| 55-155559 | 12/1980 | Japan . |
| 19611 | 9/1928 | Netherlands . |
| 77236 | 9/1954 | Netherlands . |
| 356830 | 10/1961 | Switzerland . |
| 439474 | 12/1967 | Switzerland . |
| 447352 | 3/1968 | Switzerland . |
| 383160 | 4/1954 | U.S.S.R. . |
| 240083 | 8/1969 | U.S.S.R. . |
| 243036 | 10/1969 | U.S.S.R. . |
| 450287 | 1/1976 | U.S.S.R. . |
| 760903 | 8/1980 | U.S.S.R. . |
| 165046 | 3/1922 | United Kingdom . |
| 290043 | 5/1928 | United Kingdom . |
| 706660 | 3/1954 | United Kingdom . |
| 1381109 | 1/1975 | United Kingdom . |

*Primary Examiner*—Steven L. Stephan
*Assistant Examiner*—E. To
*Attorney, Agent, or Firm*—Antonelli, Terry, Stout & Kraus

[57] ABSTRACT

An electrical power generating system (10) for generating alternating current in accordance with the invention includes a main generator (14) for generating the alternating current having a stator (22) and a rotor (24) and an exciter (12) for generating excitation current of the main generator having a stator (16) and a rotor (18) With the rotors being coaxial and driven by an input shaft (36); a cylindrical non-electrically conductive containment sleeve (70) mounted in surface contact with the coaxial rotors so that the rotors fit within the sleeve to provide support for the rotors against centrifugal acceleration and for containing coolant liquid inside the cylinder and an outside surface facing an inner cylindrical surface of the stator; and a coolant circuit (50) for circulating the coolant liquid to cool windings (30) of the main generator rotor and windings (42) of the exciter rotor, the coolant circuit including a first portion (52) through which flows the coolant liquid received from a coolant input (50) through the windings of the main generator rotor and a second portion (56) through which liquid coolant flows into contact with the windings of the exciter rotor with the containment sleeve preventing coolant from flowing radially outward into an air gap between the rotors and stators of the main generator and the exciter.

16 Claims, 1 Drawing Sheet

EXCITER ROTOR FLOW THROUGH COOLING

TECHNICAL FIELD

The present invention relates to cooling systems for exciter generators in electrical power generating systems having a main generator which is excited by an exciter.

BACKGROUND ART

The Assignee of the present invention manufactures self-excited electrical power generators for use in airframes which utilize a permanent magnet generator for generating a field for an exciter generator which generates alternating current which is rectified by a diode assembly to produce the field for the main generator. Oil is utilized as a cooling medium which is circulated through the diode assembly of the generating system for rectifying the alternating current produced by the exciter generator and through the rotor of the main generator for dissipating heat. The oil cooling permits the diode assembly and windings of the rotor of the main generator to be driven with higher currents which permit higher outputs. The leakage of oil into the air gap between the stator of the main generator and the rotor of the main generator creates windage losses.

Examples of fluid cooled electric generators are disclosed in U. S. Pat. Nos. 2,894,155, 2,897,383, 3,439,201, 3,469,127, 4,647,805 and 4,728,840. None of these systems utilizes a sleeve for containing coolant fluid from migrating radially outward from a rotor to the air gap between the rotor and the stator. As a result, leakage of coolant fluid can cause reduced efficiency especially in view of the natural propensity of oil which is the typical coolant used in cooling generators to leak from a coolant flow path.

U. S. patent application Ser. No. 765,017, entitled "Structurally Tailored Non-Metallic Stator Cooling Fluid Containment Sleeve" filed on Sep. 24, 1991, which is assigned to the Assignee of the present invention, discloses a sleeve which is press fit into the annulus of a stator which is formed from a plurality of laminations. The sleeve performs numerous functions including the containing of oil from flowing from the windings of the stator into the air gap between the stator and the rotor. As a result, the sleeve provides effective oil containment to prevent leakage of oil into the air gap between the inner diameter of the sleeve and the outer diameter of the rotor of the electric machine.

Electrical power generators which are manufactured by the Assignee for use in airframes have utilized spray cooling of oil of the exciter rotor. Spray cooling of the rotor of the exciter creates leakage of the oil into the air gap between the rotor and the stator of the exciter which reduces efficiency as a consequence of windage losses. Moreover, spray cooling does not immerse the windings of the rotor of the exciter in oil which reduces the overall efficiency of cooling over that which would be realized if a mechanism existed for containing the windings of the exciter rotor immersed in oil.

DISCLOSURE OF INVENTION

The present invention is an improved oil cooled generator of the type utilized in airframes which includes an exciter and a main generator which are coaxially mounted and cooled by a single coolant circuit for circulating the coolant fluid to cool windings of the main generator rotor and windings of the exciter rotor. With the invention, a cylindrical non-electrically conductive containment sleeve is press fit in surface contact with the coaxial rotors so that the rotors fit within the sleeve and are supported to provide hoop strength against rotational stresses produced by the high rates of revolution of the rotors which are used in alternating current electrical power generators in airframes. The exciter rotor oil, which flows in the coolant circuit that cools windings of the main generator rotor and windings of the exciter rotor, is contained radially inward of the air gap to reduce windage losses when compared to windage losses caused by spray cooling of the rotor windings of the exciter rotor in the prior art. While the containment sleeve results in increased spacing between the field windings and the main windings of the exciter, the increased cooling provided to the exciter permits higher current densities to be utilized so that the size of the exciter generator is not increased. As a result, the overall efficiency of the electrical power generating system is increased by reducing windage losses by containment of oil radially inward from the air gap between the stator and rotor. Moreover, the containment sleeve and an end cap produce a pool of coolant liquid in which the windings of the exciter generator are immersed to produce enhanced cooling when compared to that produced in the prior art by spraying coolant liquid on the rotor windings of the exciter generator.

An electrical power generating system for generating alternating current in accordance with the invention includes a main generator for generating the alternating current having a stator and a rotor and an exciter for generating excitation current for the main generator having a stator and a rotor with the rotors being coaxial and driven together by an input shaft; a cylindrical non-electrically conductive containment sleeve mounted in surface contact with the coaxial rotors so that the rotors fit within the sleeve for providing support for the rotors against centrifugal acceleration and for containing coolant liquid inside the sleeve and having an outside surface facing an inner cylindrical surface of the stators; and a coolant circuit for circulating the coolant liquid to cool windings of the main generator rotor and windings of the exciter rotor, the coolant circuit including a first portion through which flows the liquid coolant received from a coolant input through the windings of the main generator and a second portion through which liquid coolant flows to immerse the windings of the exciter rotor with the containment sleeve preventing coolant from flowing radially outward into the air gap between the rotor and the stator of the main generator and the exciter. The invention further includes a rectifier assembly for rectifying alternating current produced by the exciter with the rectified alternating current exciting the windings of the rotor of the main generator disposed axially between the coolant input and the main generator rotor with liquid coolant flowing from the coolant input through the rectifier assembly prior to flow to the first and second portions of the coolant circuit. The invention further comprises an end cap connected to an end of the containment sleeve and extending radially inward into contact with an end piece which extends radially outward from the coolant input; and a port within the end cap which extends through the end cap at a location radially inward from the containment sleeve for draining liquid coolant from the second portion of the coolant circuit in which windings of the exciter rotor are immersed into a sump. The end piece includes a shaft to which the rotors are attached to which the end cap is connected; and the sleeve, end cap and shaft define a chamber which is part of the second portion of the coolant circuit in which windings of the excitor are immersed. The rectifier assembly is disposed inside the shaft. The invention further comprises a passage in the second portion of the coolant circuit extending through the shaft to permit liquid coolant to flow radially outward from the rectifier assembly into the chamber defined by the sleeve, end cap and shaft. The invention further includes a rectifier housing containing the rectifier assembly with a channel cut in an outside wall of the housing which is part of the second portion of the coolant circuit which couples liquid coolant flowing through the rectifier assembly to the passage. The nonconductive sleeve comprises a thermoset resin and graphite fiber.

BEST MODE FOR CARRYING OUT THE INVENTION

Figure 1:
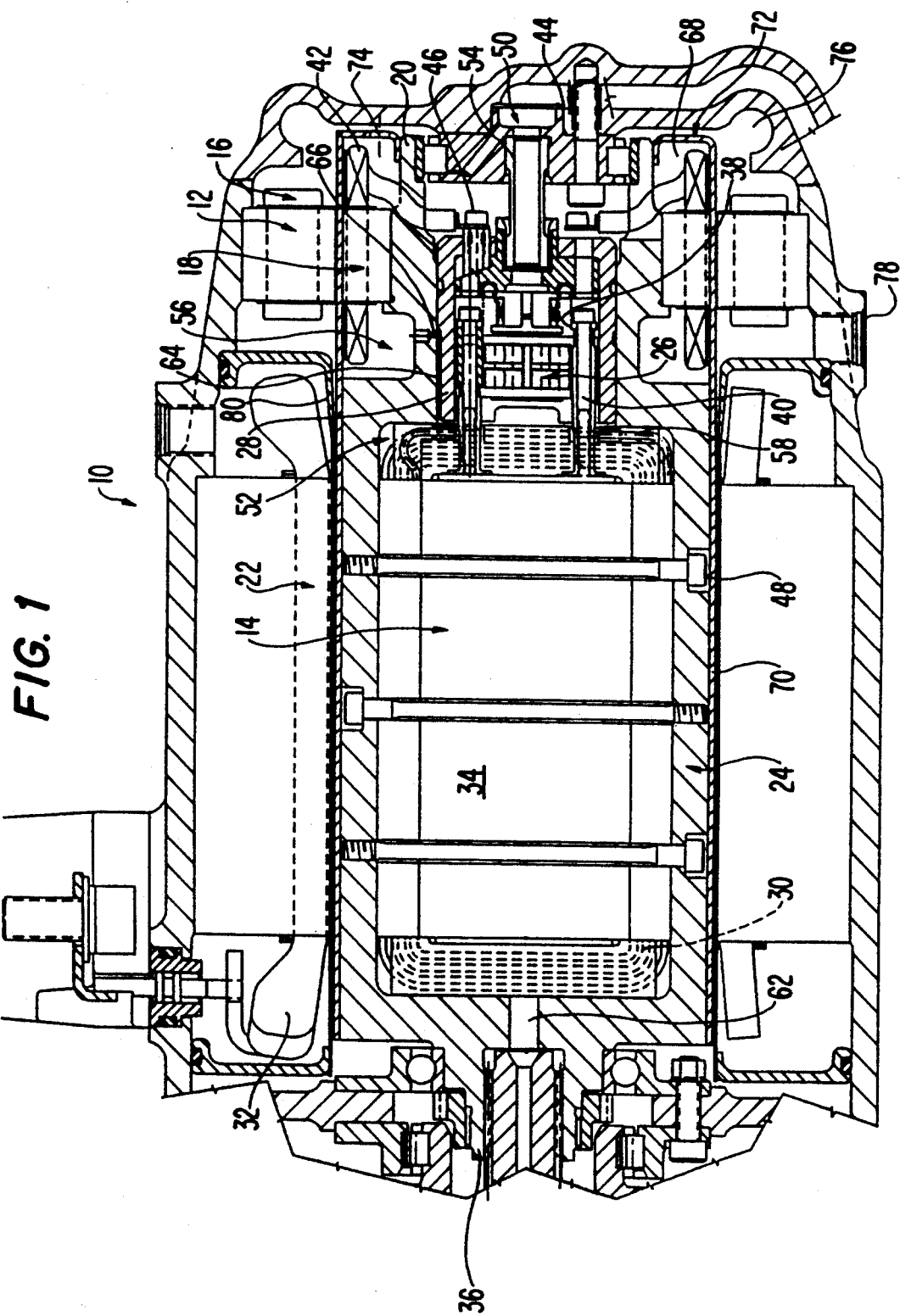
FIG. 1 illustrates a view of an electrical power generating system for generating alternating current in accordance with the present invention.

FIG. 1 illustrates an electrical power generating system 10 for generating alternating current in accordance with the present invention. A preferred application of the electrical power generating system 10 is in an airframe for the generation of 400 Hz. three-phase alternating current. The generating system 10 is self-excited by a permanent magnet generator (not illustrated) for exciting excitor generator 12 which provides excitation for main generator 14. The excitor generator 12 is comprised of a stator 16 and a rotor 18 which is joined to shaft 20. The main generator 14 is comprised of a stator 22 and a rotor 24 which is joined to the shaft 20. The shaft 20 is hollow and contains a rectifier assembly 26 which is contained in a housing 28. The rectifier assembly comprises a three-phase fullwave rectifier assembly containing a plurality of semiconductor diodes for rectifying the alternating current produced by the excitor generator 12. The DC rectified current produced by the rectifier assembly 26 is applied to the field windings 30 of the rotor 24 of the main generator 14. The alternating current produced by the generating system 10 is produced by stator windings 32. As illustrated, the main generator is a two-pole generator having pole pieces 34 which face into and outside of the plane of FIG. 1. Torque for driving the coaxial rotors which are attached to shaft 20 is applied to input 36. The DC output from the rectifier assembly 26 is applied to terminals which are electrically connected to terminal connectors 40 which make electrical contact with the field windings 30 of the main generator rotor 24. Three phase alternating current is produced by the windings 42 of the excitor rotor 18. Terminals 44 which are connected to the output of the windings 42 are connected to the terminal connectors 46 which are electrically connected to the input of the rectifier assembly 26. Fasteners 48 retain the pole pieces 34 of the main generator rotor 24 in the shaft 20.

The assembly of the present invention described above is a known assembly of a two-pole, three-phase alternating current self-excited electrical power generator utilized in an airframe.

The present invention contains a coolant circuit 50 for circulating coolant liquid, which preferably is oil, to cool the field windings 30 of the main generator rotor 24, excitor windings 42 of the excitor rotor 18 and the rectifier assembly 46. The coolant circuit is comprised of a first portion 52 through which flows the coolant liquid received from a coolant input 54 and a second portion 56 through which liquid coolant flows into contact with the windings 42 of the excitor rotor 18. The coolant circuit contains a third portion 58 connected between the input 50 and an input to the first portion 52 and a second portion 56 in which is disposed the rectifier assembly 26. The first portion 52 receives liquid coolant which has flowed through the rectifier assembly 26. The oil flowing through the third portion 58 picks up heat generated by fullwave rectification performed by the rectifier assembly of the alternating current produced by the windings 42 of the excitor generator rotor 18. The coolant liquid flows from the third portion 58 radially outward into the second portion 52 and axially along the windings 30 which are wound around a magnetic circuit coupled to the pole pieces 34. The liquid coolant flows axially along the shaft 20 in contact with the windings 30 into output 62 from which the coolant liquid flows. The second portion 56 also receives liquid coolant flowing radially outward from the third portion after passing through the rectifier assembly 26. A slot 64 cut in the outside surface of the housing 28 of the rectifier assembly 26 receives coolant liquid flowing radially outward. The coolant liquid flows along the slot 64 from left to right to passage 66. The passage 66 connects a first part of the second portion 56 of the coolant circuit 50 to a second part of the second portion. The second part of the second portion 56 of the coolant circuit 50 is disposed radially outward from the first part. The second part contains a chamber 68 in which coolant liquid collects to immerse the windings 42 of the exciter rotor 18. The immersion of the windings 42 in a pool of coolant liquid in the chamber 68 provides a higher degree of cooling than the spray cooling of the prior art. A cylindrical non-electrically conductive containment sleeve 70 is force fit over the outside surface of the rotors 18 and 24 to provide reinforcing to increase the hoop strength of the rotor assembly against centrifugal acceleration. The containment sleeve 70 forms the outside wall of the chamber 68 so that coolant liquid is retained inside of the air gap between the stator 16 and rotor 18 of the exciter generator 12. End cap 72, which may be integral with the sleeve 20 or attached thereto, extends from one end of the sleeve 70 to the shaft 20 for forming a closure to prevent the coolant liquid in which the windings 42 of the excitor rotor are immersed from running axially outward to prevent the windings from being immersed. Port 74, which is located radially inward from the containment sleeve 70 in the end cap 72, drains coolant liquid from the second portion 56 of the coolant circuit 50 in which the windings 42 of the excitor rotor 18 are immersed. The coolant draining from the port 74 runs into sump 76 and drains outward from drain 78. The structure extending from the input 54 of the coolant circuit 50 radially outward to the shaft 20 is an end piece.

Preferably, the rotor containment sleeve 70 is electrically non-conductive and provides substantial hoop strength to resist centrifugal acceleration of parts of the rotors radially outward into the air gap which is disposed between a stator containment sleeve 80 and the rotor containment sleeve 72 and also retains oil from migrating radially outward into the air gap between the rotor containment sleeve 70 and the stator containment sleeve 80. The reason that the rotor containment sleeve 70 is preferably non-conductive is that with a metallic containment sleeve eddy currents will be induced in the portion of the sleeve which is magnetically coupled to the sinusoidal varying magnetic field produced by current flow in the windings 42 of the rotor 18 of the excitor generator 12. Eddy currents reduce the overall efficiency of the operation of the generating unit by dissipating energy inputted by the input 36. Moreover, eddy currents result in heat being generated within the rotor containment sleeve 70 which further results in a requirement for additional cooling. Eddy currents are produced by the time varying magnetic field produced by the windings 42.

While the rotor containment sleeve 70 may be made by various processes using resinous non-conductive materials, a preferred composition of the rotor containment sleeve is a thermoset resin containing graphite. The graphite functions to reinforce the strength of the containment sleeve 70 which provides the hoop strength required to resist centrifugal acceleration of the rotors 18 and 24. A graphite or graphite fiber reinforced cylindrical sleeve, which is formed with a thermosetting resin, is light in weight, high in strength and is heat resistant which is ideal for the environment of an alternating current generator such as those utilized in airframes. However, it should be understood that the formulation of the cylindrical rotor containment sleeve is not limited to the use of thermoset resins reinforced with graphite and may be practiced with any non-electrically conductive composition which provides sufficient hoop strength and oil containment.

While the invention has been described in terms of its preferred embodiment, it should be understood that numerous modifications may be made thereto without departing from the spirit and scope of the invention as defined in the appended claims. It is intended that all such modifications fall with the scope of the appended claims.

I claim:

1. An electrical power generating system for generating alternating current comprising:
    a main generator for generating the alternating current having a stator and a rotor and an exciter for generating excitation current for the main generator having a stator and a rotor with the rotors being coaxial and driven together by an input shaft;
    a cylindrical non-electrically conductive containment sleeve mounted in surface contact with the coaxial rotors so that the rotors fit within the sleeve for providing support for the rotors against centrifugal acceleration and for containing coolant liquid inside the sleeve and having an outside surface facing an inner cylindrical surface of the stators; and
    a coolant circuit for circulating the coolant liquid to cool windings of the main generator rotor and windings of the exciter rotor, the coolant circuit including a first portion through which flows the liquid coolant received from a coolant input through the windings of the main generator rotor and a second portion through which liquid coolant flows to immerse the windings of the exciter rotor with the containment sleeve preventing coolant from flowing radially outward into an air gap between the rotor and stator of the main generator and the exciter.

2. An electrical power generator in accordance with claim 1 further comprising:
    a rectifier assembly for rectifying alternating current produced by the exciter with the rectified alternating current exciting the windings of the rotor of the main generator disposed axially between the coolant input and the main generator rotor with liquid coolant flowing from the coolant input through the rectifier assembly prior to flow to the first and second portions of the coolant circuit.

3. An electrical power generator in accordance with claim 1 further comprising:
    an end cap connected to an end of the containment sleeve and extending radially inward into contact with an end piece which extends radially outward from the coolant input; and
    a port within the end cap which extends through the end cap at a location radially inward from the containment sleeve for draining coolant liquid from the second portion of the coolant circuit in which windings of the exciter rotor are immersed into a sump.

4. An electrical power generator in accordance with claim 2 further comprising:
    an end cap connected to an end of the containment sleeve and extending radially inward into contact with an end piece which extends radially outward from the coolant input; and
    a port within the end cap which extends through the end cap at a location radially inward from the containment sleeve for draining coolant liquid from the second portion of the coolant circuit in which windings of the exciter rotor are immersed into a sump.

5. An electrical power generator in accordance with claim 3 wherein:
    the end piece includes a shaft to which the rotors are attached to which the end cap is connected; and
    the sleeve, end cap and the shaft define a chamber which is part of the second portion of the coolant circuit in which windings of the exciter rotor are immersed.

6. An electrical power generator in accordance with claim 4 wherein:
    the end piece includes a shaft to which the rotors are attached to which the end cap is connected;
    the sleeve and the shaft define a chamber which is part of the second portion of the coolant circuit in which windings of the exciter rotor are disposed; and
    the rectifier assembly is disposed inside the shaft.

7. An electrical power generator in accordance with claim 6 further comprising:
    a passage in the second portion of coolant circuit extending through the shaft to permit liquid coolant to flow radially outward from the rectifier assembly into the chamber defined by the sleeve, end cap and shaft.

8. An electrical power generator in accordance with claim 7 further comprising:
    a rectifier housing containing the rectifier assembly with a channel cut in an outside wall of the housing which is part of the second portion of the coolant circuit which couples liquid coolant flowing through the rectifier assembly to the passage.

9. An electrical power generator in accordance with claim 1 wherein the nonconductive sleeve comprises:
    a thermoset resin and graphite fiber.

10. An electrical power generator in accordance with claim 2 wherein the nonconductive sleeve comprises:
   a thermoset resin and graphite fiber.

11. An electrical power generator in accordance with claim 3 wherein the nonconductive sleeve comprises:
   a thermoset resin and graphite fiber.

12. An electrical power generator in accordance with claim 4 wherein the nonconductive sleeve comprises:
   a thermoset resin and graphite fiber.

13. An electrical power generator in accordance with claim 5 wherein the nonconductive sleeve comprises:
   a thermoset resin and graphite fiber.

14. An electrical power generator in accordance with claim 6 wherein the nonconductive sleeve comprises:
   a thermoset resin and graphite fiber.

15. An electrical power generator in accordance with claim 7 wherein the nonconductive sleeve comprises:
   a thermoset resin and graphite fiber.

16. An electrical power generator in accordance with claim 8 wherein the nonconductive sleeve comprises:
   a thermoset resin and graphite fiber.

* * * * *